Patented Apr. 18, 1944

2,346,671

UNITED STATES PATENT OFFICE 2,346,671

METHOD OF TREATING YEAST

John J. Enright, Pittsburgh, and Herbert Elliott Foote, Mount Lebanon, Pa., assignors to Standard Brands Incorporated, New York, N. Y., a corporation of Delaware No Drawing. Application December 30, 1942, Serial No. 470,646

5 Claims. (Cl. 195—95)

This invention relates to a method of treatment of regular commercial yeast for the purpose of changing it into a new type suitable for drying.

The first object of our invention is to produce a "conditioned" commercial bakers' yeast that will withstand the drying process. This we do economically, for we increase the yield, and to an extent more than sufficient to compensate for the wholly unexpected discovery that our new yeast satisfactory for drying is characterized by reduced fermenting power and stability in the fresh state.

A procedure heretofore proposed is to aerate regular compressed bakers' yeast, while in the condition of distribution in a sugar solution in which are present also small quantities of ammonium tartrate and calcium phosphate; and then, after aeration has had effect in the development of the yeast cells, to separate the yeast and dry it. This usual procedure we follow, with such variation of the combination of pertinent factors as we have found to afford desired results.

It has heretofore been assumed that the composition of the wort must be such and that the step of aeration must be so circumstanced that the yeast shall, during aeration, gain in baking strength, fermenting power, and keeping qualities (when in fresh state); and to that assumption the procedure has been accommodated. We find that, instead of gain, yeast suitable for drying should undergo a loss of these characteristics. This loss is compensated for economically by an appreciable increase of yield, up to 40 to 50% on the basis of the amount of original commercial yeast seeded into the conditioning solution. The increase of yield attained by former processes has been of the order of 20 or 25 per cent. The fact has been recognized that the step of aeration is one in which the yeast cells increase in size, and the fact has been recognized that during aeration the quantity of available nitrogen should be small, lest another phenomenon become dominant, namely, the multiplication of cells. It has, however, been deemed a matter of practical necessity that baking strength, fermenting power, etc., be maintained and increased; and, accordingly, it has been deemed a matter of practical necessity that the quantity of ammonium tartrate present in the sugar solution be not less than, but preferably more than, 1% by weight of the quantity of yeast under treatment, and also that the yeast be dispersed in relatively little water, that is, 1 pound of yeast to one or two gallons of water, and that aeration be slow.

Our investigation has shown us that the yeast, so circumstanced during aeration, is susceptible to injury in drying. And we have discovered that, by still further reducing the quantity of ammonium tartrate, dispersing the yeast in a more dilute suspension, and aerating fast and vigorously, although we bring these combined factors to such values that the yeast will not be improved in baking strength, etc., but will suffer rather some diminution, we can bring the yeast to such condition that it may be dried without injury.

By way of example, we prepare a solution according to the following formula:

|   | Pounds |
|---|---|
| Disperse in 234 gallons of water granulated cane sugar or its equivalent | 17.66 |
| Ammonium tartrate | 0.20 |
| Calcium mono-hydrogen phosphate | 0.30 |
| Fresh compressed commercial yeast | 40.0 |

It will be remarked that the content of ammonium tartrate is less than 1.0% of the amount of yeast that is dispersed in the solution and that the amount of sugar in solution is approximately one per cent, or 40 to 50%, more particularly 44 to 46% based on the amount of yeast. Other ammonium compounds may be used, e. g., hydroxide, carbonate, sulfate, acetate, lactate, citrate, etc. As a yeast assimilable nitrogen source utilization may be made also of organic compounds, e. g., urea, aspartic acid and asparagine.

The calcium phosphate ingredient of the formula given above is that of the known procedure, alluded to. The known role of the calcium phosphate is to afford material for the production of a sugar-phosphate ester. However, the invention, consisting as it does in certain modifications of a known procedure to achieve new utility, leaves this matter of sugar-phosphate production unaltered. Whatever the specific material that performs this function, our invention lies elsewhere.

We provide apparatus such as to accomplish aeration with great expedition and thoroughness. We provide a cylindrical tower or tank two feet in diameter, into which we introduce the yeast dispersion, and within which the dispersion in quantity given above rises in a column ten feet high. The aeration means may be four cylinders of aluminum oxide arranged radially at the bottom of the tank. These cylinders, otherwise closed, are fed interiorly with compressed air. The cylinders are alike, each 8 inches long, $4\frac{1}{16}$ inches in exterior diameter, 3 inches in interior diameter, and having a total surface area of 368 square inches. They have a rated permeability of 37 cubic feet per minute per square foot for a two inch pressure drop.

We maintain the liquid within the tank at the conventional temperature of 80 to 85° F., and we inject air at the rate of about 40 to 50 cubic feet a minute. Aeration continues for four to seven hours.

Aeration at this rate may be characterized as a fast and vigorous aeration, particularly when thinness of the yeast dispersion (one pound in six gallons of liquid) is brought into consideration; for it is commonly known that the greater the quantity of water, relatively to the quantity of yeast, the greater the opportunity for effective supply of oxygen to the yeast. Moreover, the dilution may be upwards from about three gallons of liquid, i. e., one pound of yeast calculated as compressed yeast to about three gallons of medium, and satisfactory results have been obtained with dilutions of three, four and six gallons of medium per pound of yeast. Furthermore, higher dilutions may be used, if desired.

It will be realized that the rate of aeration is variable and depends upon the size and shape of the vat and the dilution in which the yeast is being conditioned. Hence, while the rate given is for the conditioning of 40 lbs. of yeast in a fermenter containing 240 gallons of water, other rates will pertain when fermenters of different sizes and shapes are utilized. The immediate purpose of aeration is to maintain a dissolved oxygen concentration satisfactory for obtaining yeast of proper quality and yield. Yeast of proper quality contains 5.8% to 6.8% nitrogen on a dry basis, and preferably 6.5%. Proper yield is at least a 40% increase in weight of the yeast based on the amount of commercial yeast seeded into the conditioning solution. It is of import that the dissolved oxygen concentration of the wort be maintained at a minimum of 50 per cent of saturation, and preferably at 60 to 70 per cent. We have maintained this dissolved oxygen concentration by aerating at 120 cubic feet per minute when the yeast concentration is one pound in 3 gallons, and preferably at 40 cubic feet per minute when the yeast concentration is one pound in six gallons in a fermenter having a diameter of about two feet. It may be more economical under certain plant conditions to use even a more dilute yeast suspension and a still lower rate of aeration.

When the conditioning has been completed the liquid is withdrawn from the tank and, by well known means, the yeast may be harvested at about 66 to 75%, especially at about 70% moisture content, the yeast after aeration (during which its cells have grown but have not multiplied more than 10% and preferably not at all) may contain from about 5.8 to 6.8%, more particularly about 6.5% nitrogen on a dry basis. Regular bakers' yeast, made by any of the salt and molasses processes preferred, contains 8.5 to 9.5% nitrogen. The process is also suitable when the seed is bakers' yeast made from other carbohydrate sources, such as steep water.

This application is in part a continuation of our copending application Serial No. 327,862, filed April 4, 1940.

The procedures described will be understood to be typical and exemplary. The knowledge of the art is available, and departures are permissible, so long as the essential features severally defined in the ensuing claims are retained.

Having described our invention, what we claim as new and desire to secure by Letters Patent is:

1. A method for the treatment of yeast, which comprises subjecting yeast to vigorous aeration in a medium containing a sugar, a yeast assimilable nitrogen source and a phosphate, said yeast being dispersed in the medium in the proportion of about 1 pound, calculated as compressed yeast to upwards of about 3 gallons of medium, and said nitrogen being present in an amount which, calculated as ammonium tartrate, is less than 1% of seeded yeast, whereby an increase in yield is realized with an attendant loss of baking strength and stability, the increase in yield affording in leavening efficiency compensation for loss.

2. A method for the treatment of yeast, which comprises subjecting yeast to vigorous aeration in a medium containing a sugar, ammonia nitrogen and a phosphate, said yeast being dispersed in the medium in the proportion of about 1 pound, calculated as compressed yeast, to about 6 gallons of medium, said sugar being present in an amount of about 1%, and said nitrogen being present in an amount which, calculated as ammonium tartrate, is less than 1% of seeded yeast, whereby an increase in yield is realized with an attendant loss of baking strength and stability, the increase in yield affording in leavening efficiency compensation for loss.

3. A method for the treatment of yeast, which comprises subjecting yeast to vigorous aeration in a medium containing a sugar, ammonia nitrogen and a phosphate, said yeast being dispersed in the medium in the proportion of about 1 pound, calculated as compressed yeast, to about 6 gallons of medium, said sugar being present in an amount of about 1%, the medium being at a temperature of about 80–85° F., and said nitrogen being present in an amount which, calculated as ammonium tartrate, is less than 1% of the seeded yeast, whereby an increase in yield is realized with an attendant loss of baking strength and stability, the increase in yield affording in leavening efficiency compensation for loss.

4. A method for the treatment of yeast, which comprises subjecting yeast to vigorous aeration in a medium containing a sugar, ammonia nitrogen and a phosphate, said yeast being dispersed in the medium in the proportion of about 1 pound, calculated as compressed yeast, to about 6 gallons of medium, said sugar being present in an amount of about 1%, the medium being at a temperature of about 80–85° F., said nitrogen being present in an amount which, calculated as ammonium tartrate, is less than 1% of the seeded yeast, and the aeration being at a rate of about 50 cu. ft. per minute per 240 gallons of medium for a period of about four hours, whereby an increase in yield is realized with an attendant loss of baking strength and stability, the increase in yield affording in leavening efficiency compensation for loss.

5. A method for the treatment of yeast, which comprises subjecting yeast to vigorous aeration in a medium containing a sugar, ammonia nitrogen and a phosphate, said yeast being dispersed in the medium in the proportion of about 1 pound, calculated as compressed yeast, to about 6 gallons of medium, said nitrogen being present in an amount which, calculated as ammonium tartarte, is less than 1% of seeded yeast, and the aeration being at a rate of about 50 cu. ft. per minute per 240 gallons of medium, whereby an increase in yield is realized with an attendant loss of baking strength and stability, the increase in yield affording in leavening efficiency compensation for loss.

JOHN J. ENRIGHT.
HERBERT ELLIOTT FOOTE.